T. M. OBSBOUM.
CUFF LINK.
APPLICATION FILED MAR. 29, 1915.
1,192,101.  Patented July 25, 1916.
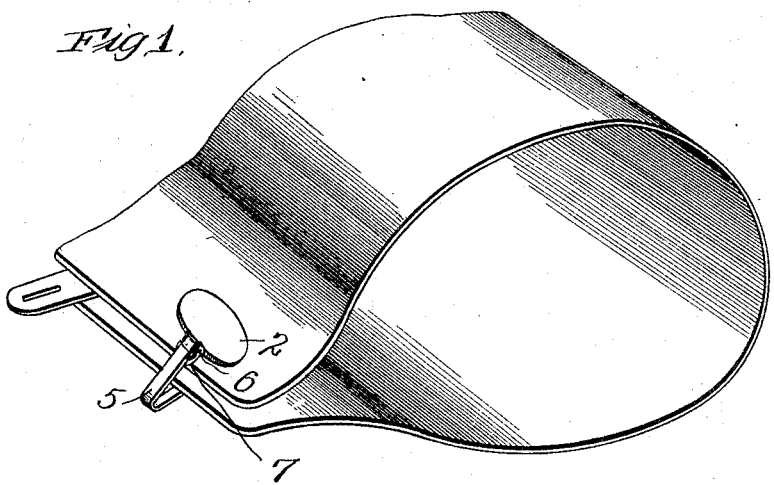
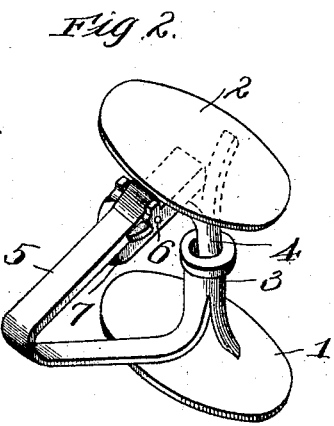
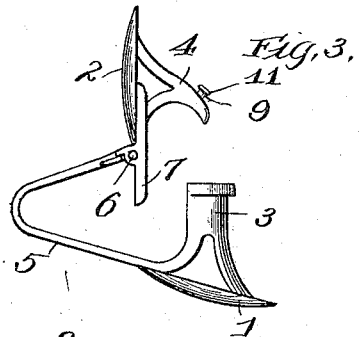
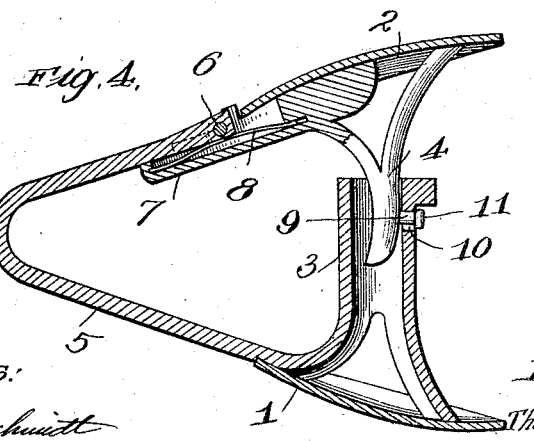
Witnesses:
Inventor:
Thomas M. Obsbourn
By Miller Schindell
Attys

UNITED STATES PATENT OFFICE.

THOMAS M. OBSBOUM, OF CHICAGO, ILLINOIS, ASSIGNOR, BY DIRECT AND MESNE ASSIGNMENTS, TO THE O. Z. O. JEWELRY MANUFACTURING COMPANY, OF CHICAGO, ILLINOIS, A CORPORATION OF ILLINOIS.

CUFF-LINK.

1,192,101.  Specification of Letters Patent.  Patented July 25, 1916.

Application filed March 29, 1915. Serial No. 17,612.

*To all whom it may concern:*

Be it known that I, THOMAS M. OBSBOUM, a citizen of the United States, residing at Chicago, in the county of Cook and State of Illinois, have invented certain new and useful Improvements in Cuff-Links, of which the following is a specification.

The ordinary cuff link consists of a bar having heads rigidly connected to its opposite ends. It is often troublesome to force these heads through the button-holes of a starched cuff. Efforts have been made to produce cuff links having separable heads, but none of them have been convenient to operate, nor arranged to be securely connected to the cuff.

The object of this invention is to produce a cuff link which may be easily and quickly connected to and disconnected from the cuff, and which shall not be liable to be accidentally detached from the cuff.

In the accompanying drawings, Figure 1 is a perspective view of a cuff showing a cuff link inserted in place. Fig. 2 is a perspective view of the cuff link upon an enlarged scale. Fig. 3 is an elevation of the cuff link showing it in the opened position. Fig. 4 is an enlarged sectional view of the cuff link in the closed position.

The form of cuff link herein illustrated may be briefly described as comprising two heads, one of which is provided with a securing member in the form of a socket and the other of which is provided with a securing member adapted to enter the socket, said second mentioned securing member being preferably in the form of a slightly curved projection, one of the heads being rigidly connected to a bent bar and the other head being pivotally connected to said bar.

In the drawings, 1 and 2 are the heads. These may be of any desired size and shape and may be of any preferred ornamental character. To the head 1 is rigidly secured a tubular socket 3 adapted to receive a projection 4 which is fixed to the head 2. The head 1 and the socket 3 are connected in a suitable manner (preferably rigidly) to one end of a bar 5. This bar is bent into approximately V-shape to receive or span the adjacent longitudinal edges of the cuff. The head 2 and the projection 4 are pivotally connected to the opposite end of the bar 5 by means of a pivot pin 6. Rigid with the head 2 and projection 4 is an arm 7 extending beyond the pivot 6 into position to underlie the adjacent portion of the bar 5 and thus constitute a stop to limit pivotal movement of the head 2 and projection 4. In order to yieldingly hold the head 2 in the opened and closed positions, I provide suitable means, as, for example, a leaf spring 8 contained within a recess formed in the arm 7 and the adjacent portion of the head 2 and projection 4. Said spring is adapted to bear against the flat side of the bar 5 to yieldingly hold the head 2 is closed position, and is adapted to bear against the flattened end of the bar 5 to yieldingly hold the head 2 open.

To supplement the action of the spring 8 in holding the head 2 in closed position, there may be provided, if desired, a stud 9 on the side of the projection 4 which is farthest from the pivot 6, said stud being adapted to pass through an opening 10 in the wall of the socket 3 and having a head 11 adapted to overlie the edge of the opening 10. The bar 5, while substantially rigid, possesses sufficient resiliency to permit the headed stud 9 to be forced out of the opening 10 by the user.

When the link is to be used to hold the two edges of a cuff together, the link is opened, as shown in Fig. 3, and the link is placed upon the cuff, the edges of the cuff entering between the socket 3 and the projection 4. The socket 3 is then inserted through the button-hole in one side of the cuff, the projection 4 is passed through the companion button-hole and the head 2 is pivotally moved to place the projection 4 within the socket 3. If the supplemental locking means 9, 10 is used, the operator springs the bar 5 sufficiently to enable the stud 9 to enter the socket 3, said stud entering the opening 10.

It will be understood that if it is not desired to make both sides of the cuff link ornamental, one of the heads 1 and 2 may be omitted.

I have used the term "button-hole" to designate an opening in the cuff of any suitable shape to receive the fastening herein disclosed.

I claim as my invention:

1. A cuff link comprising a V-shaped bar adapted to embrace the edges of a cuff, and two interengaging securing members adapted to pass through the button-holes of the cuff, one of said members being rigidly connected to one end of said bar, the second of said members being pivotally connected to the other end of said bar for movement toward and away from the other.

2. In a cuff link, the combination of a substantially rigid bent bar adapted to embrace the edges of a cuff, two securing members adapted to pass through the button-holes of a cuff and attached to said bar, said members consisting of a socket secured to one end of said bar, and a projection adapted to enter said socket, said projection being pivoted to the other end of said bar, and a spring tending to hold said projection in said socket.

3. In a cuff link, the combination of a substantially rigid bent bar adapted to embrace the edges of a cuff, a socket secured to one end of said bar, a projection adapted to enter said socket, said projection being pivoted to the other end of said bar, and a spring tending to hold said projection in said socket, one of the two last mentioned parts having an opening, and the other of said parts having a locking member adapted to enter said opening.

In testimony whereof, I hereunto set my hand in the presence of two witnesses.

THOMAS M. OBSBOUM.

In the presence of—
JOHN GRETING,
JACOB BANK.

Copies of this patent may be obtained for five cents each, by addressing the "Commissioner of Patents, Washington, D. C."